Sept. 11, 1934.  P. L. GEER ET AL  1,973,689
METHOD OF AND APPARATUS FOR MELTING GLASS ETC
Filed March 1, 1932  4 Sheets-Sheet 1
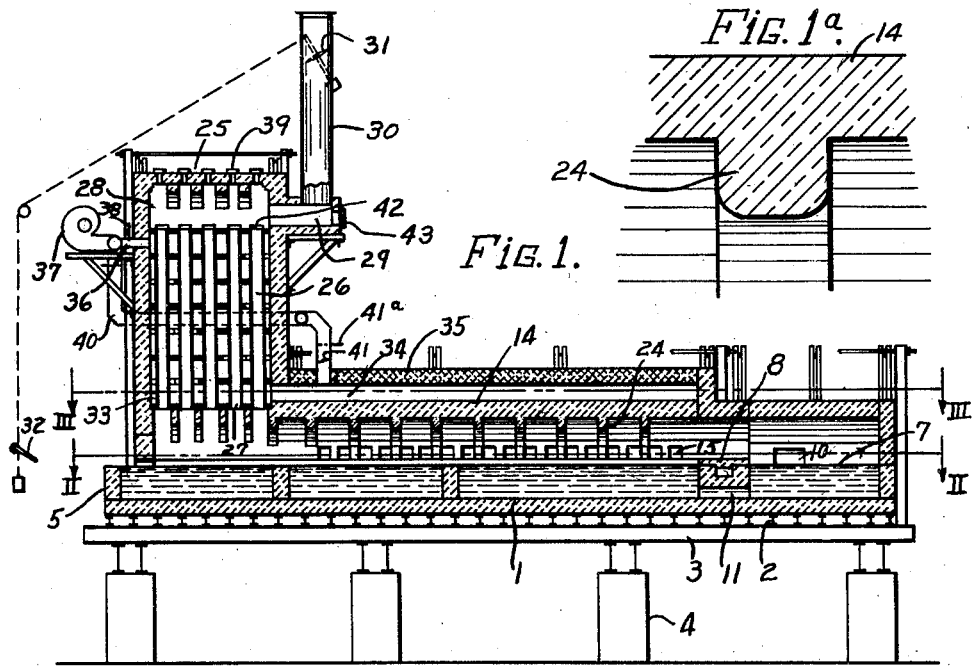
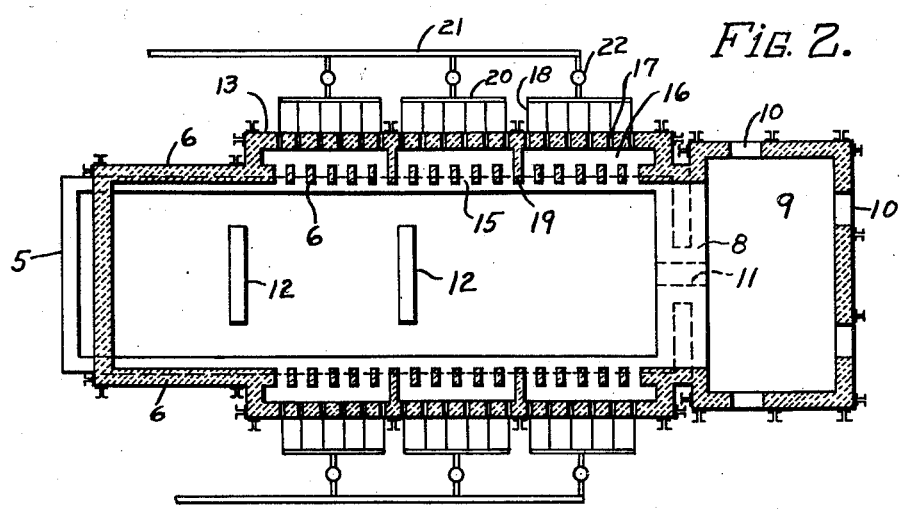
INVENTORS
PAUL L. GEER
HAROLD A. MOORE
WILLIAM A. MORTON
BY
William B. Jaspar ATTORNEY Sept. 11, 1934.   P. L. GEER ET AL   1,973,689
METHOD OF AND APPARATUS FOR MELTING GLASS ETC
Filed March 1, 1932   4 Sheets-Sheet 2
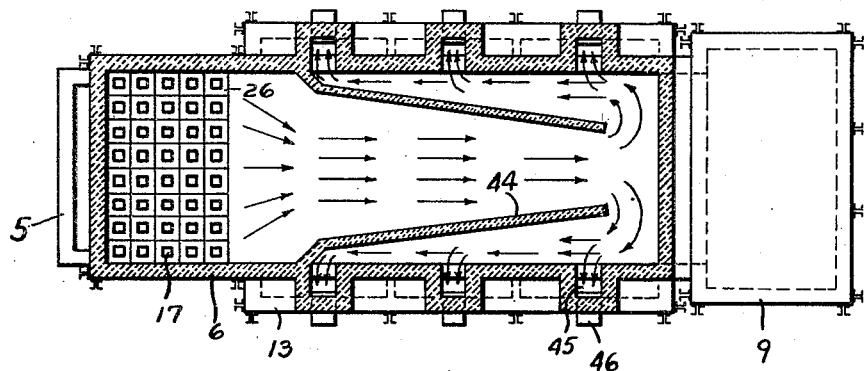
Fig. 3.
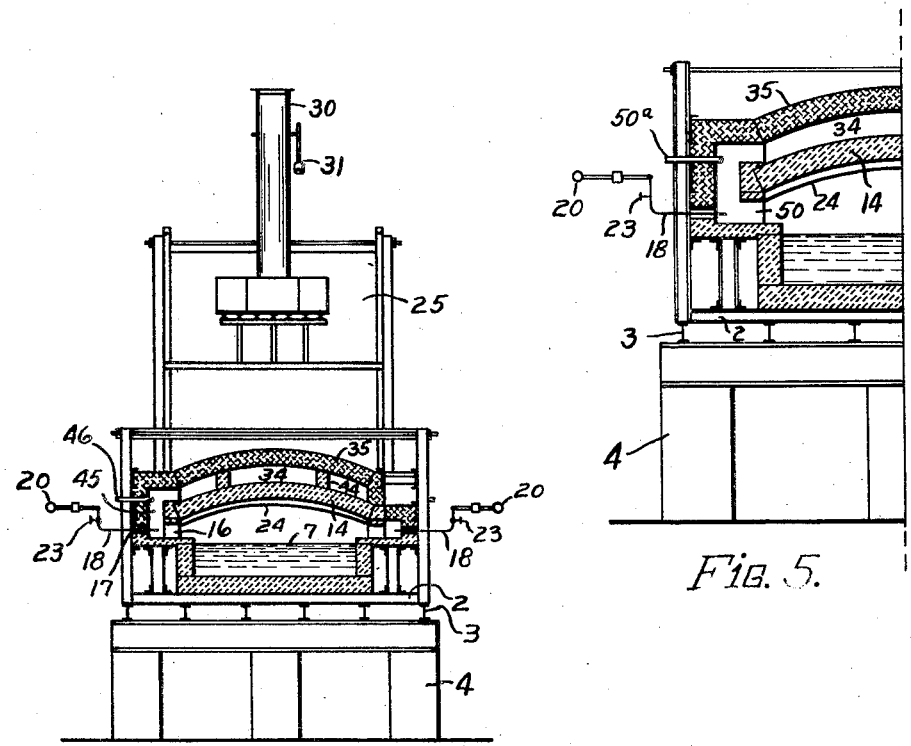
Fig. 4.
Fig. 5.
INVENTORS
PAUL L. GEER
HAROLD A. MOORE
WILLIAM A. MORTON
BY
William B. Jaspert ATTORNEY

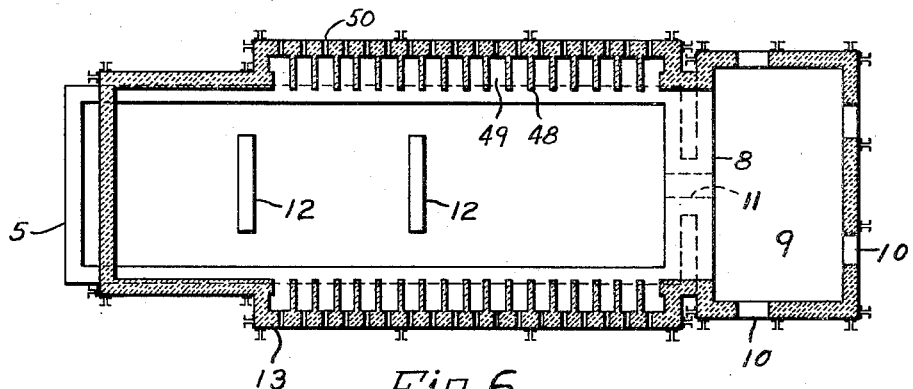
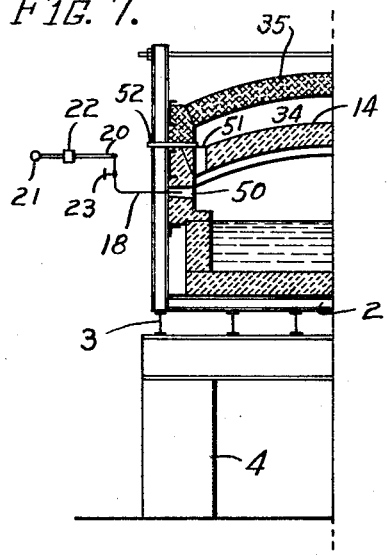
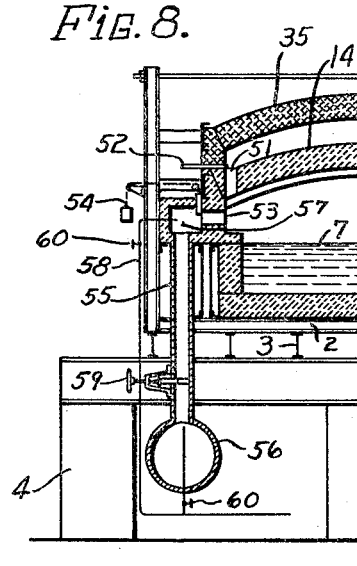
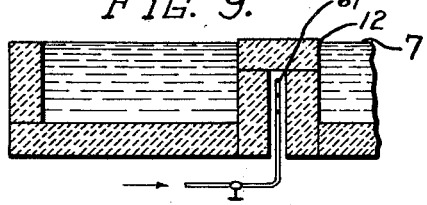

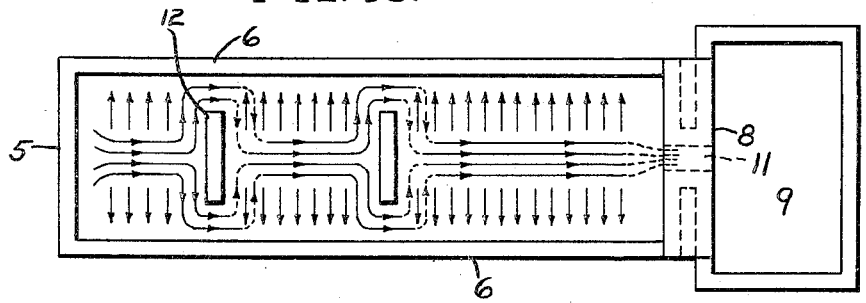
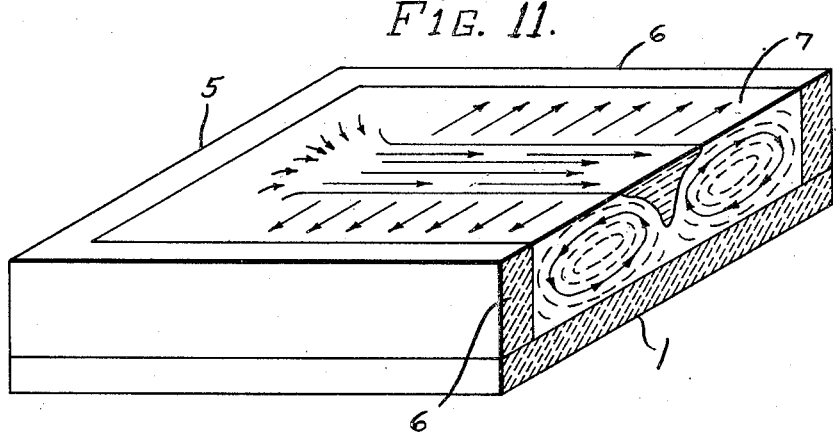

Patented Sept. 11, 1934

1,973,689

UNITED STATES PATENT OFFICE 1,973,689

METHOD OF AND APPARATUS FOR MELTING GLASS, ETC.

Paul L. Geer, Pittsburgh, Harold A. Moore, Wilkinsburg, and William A. Morton, Pittsburgh, Pa., assignors to Amco, Incorporated, Pittsburgh, Pa., a corporation of Pennsylvania Application March 1, 1932, Serial No. 595,980

24 Claims. (Cl. 263—15)

This invention relates to the method of and apparatus for melting glass, enamels, glazes, and other products of glasslike character.

The conventional apparatus for melting glass or the like comprises a melting tank with a refining compartment. The batch or raw material is charged into the melting tank proper through what is generally termed a dog house which extends from the sides or end wall of the furnace, depending upon the location of the burners.

The batch is composed of finely ground material and contains considerable dust which, when charged into the furnace in its unmelted state, comes in contact with the fire and its resultant currents, which have sufficient velocity at melting temperatures to lift the finer particles into the furnace atmosphere. A portion of these particles are swept into the refining compartment, causing seed or bubbles in the finished product.

The present dog house is usually very small compared with the area of the tank furnace and for that reason large quantities of batch materials are charged therethrough which, when they enter the furnace, travel quickly to the throat at the forward end of the tank reaching there frequently before it is thoroughly melted, with the result that the unmelted material mixes with the melted material, resulting in glass of inferior quality.

This, however, in the present stage of the art is generally corrected by reducing the output of the furnace, thereby decreasing the velocity of the moving batch and the glass to a rate at which it will be thoroughly melted, but this is an uneconomical method of obtaining the desired results.

Another serious defect in present furnace design is the relatively small flame area available to contact with the glass, particularly in the side port type furnace. It is common practice to place the regenerators or recuperators beneath the floor of the factory from which uptakes are extended to the burners or ports. This is done because ample room must be provided in and around the ports to enable the workmen to have convenient access to the burners, and to the furnace to facilitate repairs, and on account of the size of the port walls which are usually made quite thick to prevent undue heat radiation, the resultant available port width is reduced to a minimum by mechanical and structural limitations or usually to about one-third or less of the length of the hearth, thereby decreasing the flame area and the melting capacity of the furnace.

This invention proposes to overcome such inherent design defects and for this purpose a tank with three or more compartments instead of two is employed. The first compartment shall be known as a fusing zone wherein the batch shall receive heat treatment to fuse it on the exposed surface before it enters the melting zone, thereby preventing the batch dust from becoming suspended in the melting laboratory. A waste gas outlet is provided directly over the fusing chamber in order that all waste gases shall be removed at the rear of the furnace and by causing all gases of combustion to flow in the opposite direction from the movement of the glass in the furnace, the possibility of batch dust entering the melting or refining compartment is eliminated. The rapid movement of the waste gases opposes and retards the movement of the surface batch and holds it at the rear of the furnace until melted.

The invention also provides for extending the fusing chambers laterally beyond the retaining walls for the glass so that the batch may be more widely distributed in a thin layer to the exposed glass throughout the width of the tank whereby to provide more time for fusing by preventing the batch from following a narrow path to the throat. In order to further guard against so called channeling of the molten glass in the mass, baffle walls of high quality flux resisting refractory such as mullite or its equivalent are interposed in the glass stream.

The heat exchanger is located above the furnace directly over the fusing chamber to conserve space and reduce heat losses. In this manner the waste gases from the furnace pass directly up through the tubes of the heat exchanger, while the combustion air passes around the tubes and between an upper and lower furnace crown to the furnace ports.

The structural and functional features characterizing the invention will become more apparent from a consideration of the accompanying drawings constituting a part hereof in which like reference characters designate like parts and in which:

Figure 1 is a vertical cross sectional view taken longitudinally of a melting tank and recuperator structure embodying the principles of this invention;

Figure 1—a a cross sectional view of a portion of the crown of the tank showing a rib or depression, the purpose of which will be hereinafter explained;

Figure 2 a horizontal cross sectional view of the structure shown in Figure 1 taken along the line II—II thereof;

Figure 3 a horizontal section taken along the lines III—III of Figure 1;

Figure 4 a transverse vertical section of a glass melting tank showing the recuperator and stack in rear elevation;

Figure 5 a partial cross sectional elevational view of the melting tank and crown, showing a modified burner port arrangement;

Figure 6 a horizontal section of still another type of modified form of melting tank;

Figure 7 a vertical half section through the burner port;

Figure 8 a similar section showing a modified form of burner port;

Figure 9 a cross sectional view of a portion of the glass tank illustrating means of cooling the baffle members therein to maintain them at suitable temperature;

Figure 10 a top plan view of the glass retaining portion of the tank graphically illustrating the flow of the glass from the rear to the front or refining zone of the tank; and, Figure 11 is a perspective view in sectional elevation graphically illustrating the flow of the glass through a section of the tank.

With reference to Figures 1 to 2 of the drawings, the structure therein illustrated comprises a hearth 1 mounted on transverse beams 2 supported by longitudinal beams 3 which in turn are carried by pillars 4 of masonry construction, the hearth 1 having side and end walls 5 and 6 constituting the tank proper in whch the molten glass designated by the reference numeral 7 is retained.

A bridge-wall 8 extends transversely of the tank and above the level of glass 7, this wall dividing the melting chamber from the working chamber designated by the reference character 9, the chamber 9 having openings 10 through which the glass is withdrawn for use. The bridge-wall 8 is provided with a flow channel 11 at the bottom thereof.

Baffle walls 12 of high quality flux resisting refractory material such as mullite or its equivalent are interposed in the glass stream to guard against so-called channeling of the glass as is illustrated in Figures 10 and 11 of the drawings.

Above the tank proper, the walls extend upwardly and the side walls extend transversely to beyond the width of the glass retaining wall 6, these extended side walls being designated by the reference character 13. A crown 14 extends over the tank and walls 13 are provided with openings 15 which establishes communication of the interior of the tank with spaces 16 formed by the extended wall 13 which constitute fusing chambers. Port holes 17 which constitute the burner ports have burners 18 which are projected into the fusing chambers 16.

The fusing chambers 16 are divided by walls 19 into separate zones to provide for better temperature regulation throughout the length of the melting tank. The burners 18 are connected to manifolds 20 which have a common supply line 21 for supplying fuel, the manifolds being controlled by adjustable pressure regulators 22 and the burners 18 being separately or individually controlled by valves 23 as shown in Figures 4, 5 and 7 of the drawings.

The inner crown of the tank is provided with ribs or depressions 24 extending in longitudinally spaced relation, the ribs being shown in an enlarged view in Figure 1—a of the drawings. By means of the depressions or ribs which are an integral part of the crown, the crown and ribs will become incandescent and will add to the melting ability of the furnace by reflecting this incandescent heat to the surface of the glass. It is, of course, evident that the roof of the furnace even without these ribs will reflect this heat but the radiating surface of the crown is greatly increased by the use of the ribs and will consequently increase the melting capacity of the furnace, at the same time reducing its fuel consumption.

A recuperator generally designated at 25 is constructed above the rear portion of the tank to constitute a vertical extension of the melting chamber. The recuperator is provided with tile 26 forming vertical passages 27 leading from the melting chamber to a chamber 28 at the top of the recuperator structure which chamber communicates through a passage 29 with a stack 30, the latter being provided with a damper 31 controlled by lever 32.

The vertical flues 27 of the recuperator structure are in heat exchange relation with horizontal flues 33 which constitute the air passages of the recuperator, the lower one of which communicates with the air space 34 and thence with substantially parallel return flues 34' constituted by a double crown or upper insulating cover 35.

The horizontal air passages communicate with each other and terminate in the conduit 36 which is attached to a blower 37 by means of which air is conducted through the recuperator structure to the space 34 between the double crown and directed to the melting chambers adjacent the burner ports 17. A damper 38 is provided in the conduit 36 to regulate the volume of air forced through the horizontal recuperator passages.

The crown wall of the recuperator is provided with plugged openings 39 to render the vertical waste gas flues or passages 27 accessible for cleaning if the passages become clogged by the flux of the glass batch. However, by providing a bypass 40 from the blower 37 to the air space 34 and controlling the bypass with dampers 41 and 41—a, air may be diverted from the horizontal air passages of the recuperator tile thereby increasing the temperature of the tile wall to the point where any flux adhering thereto may be melted off and allowed to drip into the fusing zone underneath.

The top of the vertical flues 27 may be provided with dampers 42 and a door 43 is provided on the exterior of the stack passage 29 to render the latter accessible for cleaning and to provide access to the interior of the recuperator chamber 28.

With reference to Figure 3 of the drawings, the arrows designate the direction of travel of the heated air passing from the recuperator tile structure 26 to the front end of the tank from which it is diverted to the sides and passes back of deflecting members 44 to vertical passages 45 leading to the fusing zones 16 constituted by partitions 19, these passages being controlled by dampers 46 to regulate the supply of air as desired.

The construction of the double crown 14 and 35, the air space therebetween divided by the baffles 44, the vertical passages 45, dampers 46, and disposition of the burners 18 in the burner port 17 is more clearly shown in Figures 4 and 5 of the drawings.

In the modification shown in Figures 5 and 6 of the drawings, the wall 13 forming the laterally extending fusing chamber of the melting tank is provided with rib like projections 48 to form individual burner chambers 49 therebetween to which burner ports 50 conduct the fuel supply.

In the construction shown in Figure 7, the passages 51 which supply the pre-heated air from the space 34 between the double crowns is in vertical alinement with the ends of the burner port 50 and the passages 51 are controlled by dampers 52.

In the modification shown in Figure 8, the tank is adapted for the use of producer gas which is fired at the ports 53 which terminate directly below the air passages 51, the burner ports being controlled by counterweighted dampers 54 and the air supply to each port being controlled by dampers 52. Each burner port is provided with a pipe 55 leading from a gas main 56 to a gas box 57. Compressed air lines 58 are provided to permit blowing and burning out the soot which will accumulate in the vertical pipes 55. A valve 59 controls the volume of gas to the gas boxes 57, and valves 60 regulate the supply of compressed air.

In Figure 9, a circulating system 61 for a cooling medium is disposed in the baffle wall 12 to reduce its temperature, and in Figures 10 and 11 the arrows designate the flow of the glass, the longitudinal arrows representing the channeling, the transverse arrows the eddies which cause the glass to twirl as shown in section in Figure 11.

By means of the above described apparatus, the glass, enamels, glazes, or other products of glass-like character are melted as follows:

The glass batch is fed through a dog house under the wall at the rear end of the tank which is the fusing zone below the recuperator structure 25. The batch dust if picked up by the gases of combustion will be carried up into the heat exchanger tubes 27 instead of into the furnace proper. Most of this dust will be fused by the action of the heat and will be deposited on the walls of the tubes 27 in the lower part of the heat exchangers from the hotter lower portion of which it will drip down into the fusing zone of the furnace in the form of globules of molten glass. The glass will then move forward to the next zone which is the melting zone of the tank against the action of the waste gases to the fusing zone, these movements of the waste gases will tend to hold the surface batch at the rear or in the fusing zone of the furnace until melted.

By means of the minute regulation of the burners 18 in the lateral fusing chambers, the glass is subjected to heat treatment in any desired manner so that it will be properly melted and refined when it passes through the submerged channel 11 of the bridge-wall 8 into the working chamber 9 at the front of the tank.

By virtue of the relatively long path of flow of the preheated air passing from the horizontal passages of the recuperator over the crown of the tank to the front thereof and then returning around the baffle wall 44 to the vertical passages towards the rear thereof, the air is heated to a maximum temperature thus further aiding the combustion of the fuel in the laterally extending fusing chambers. By this construction of the air passage, the heat of the melting tank is utilized to a maximum as radiation from the crown 14 is absorbed by the incoming air. The transverse baffle walls 12 eliminate or reduce the channeling of the glass and retard the glass movement causing it to flow laterally to subject it to the heat of the burner ports so that all of the glass is of subsantially uniform temperature as it passes through the channel 11 into the working chamber.

By employing the laterally extending fusing chambers and raw materials supply opening the surface batch is permitted to spread over a larger area than normally whereby it is more quickly fused as the batch material is fed into the tank in a thin widely distributed manner.

As the vertical flues 27 of the recuperator accumulate the batch materials to an undesirable degree, the air from the blower 27 is bypassed through the conduit 40 to the burner ports to raise the temperature of the vertical flues to any desired degree.

When so heated, the batch adhering to the walls of the vertical tubes will become fused and drip downward into the fusing chamber of the melting tank. However, if desired, the plugged openings 39 in alinement with the vertical flues are available for breaking off these adhering particles from the walls of the vertical flues.

By utilizing the bypass from the fan with a damper to lead air from the fan to the air heating space between the two arches, the operation of the furnace may be continued while the flux is melted in the waste gas passages of the recuperator structure, which is believed to provide an entirely novel means for preventing said passages from becoming clogged.

The chemical composition of the globules melting from the batch in the recuperator tile will not be exactly the same as that of the main body of the glass, but inasmuch as the relative quantity is small compared to the total quantity of glass in the furnace, these globules are introduced in the fusing zone directly beneath the recuperator, which zone is of greatest chemical reaction, and reenter the batch and are thoroughly absorbed by the main body of glass.

The tubes in the lower part of the recuperator and the braced arches supporting these tubes are made of high quality combined temperature and flux resisting refractory materials such as mullite or sillimanite to resist the fluxing action of the molten batch dust and to carry the superposed structural load. The roof of the recuperator is made flat and is supported by a series of narrow arches as shown in Figure 1 of the drawings.

By off-setting the stack 30 from the vertical waste gas passages, the inertia effect of the gases is reduced so that the chamber 28 at the top of the vertical passages causes a distribution of the waste gases resulting in uniform draft to all of the vertical passages. Further regulation for obtaining a balance of distribution of waste gases is provided for by controlling the dampers 42 in the individual waste gas passages.

By utilizing the double crown with the air space 34 therebetween, the crown 14 is protected against over-heating thus prolonging its life; and further, by applying the baffle walls 44 for directing the preheated air in its travel between the two arches, its velocity is varied and its length of travel is increased in a desirable manner to increase the final air preheat temperature.

The port arrangement shown in Figures 1, 2, 3 and 4 includes a gallery port continuous throughout the length of the melting compartment. With this construction, the port openings may be spaced closely together since the walls between the port openings which support the upper structure may be made narrow. Thus, a large number of burner ports is made possible and the entire hearth may be covered with the melting flame which is always higher than the furnace temperature. The gallery ports are divided into a plurality of compartments by the walls 19, Figure 2, of the drawings and the vertical flues 45 lead the preheated air from between the two crowns to each compartment. Each flue is provided with a damper control 46 so that each section or compartment may have separate control of preheated air. One feature of the construction herein disclosed is that the furnace steel supports for the arch are located outside the hollow walls, this arrangement of the ports conserves space and makes it possible to have continuous high temperature flame entirely along each opposite side of the furnace instead of the ordinary arrangement in which only a limited portion of the furnace is heated with the initial temperature of the flame and the balance with the gradually lowering waste gas temperature.

Figure 2 shows the method of supplying fuel oil to the burners. All of the burners for each gallery compartment are connected to a separate manifold, there being as many manifolds as there are compartments. Each manifold is connected to the supply line 21 to an adjustable pressure regulator 22. In addition, each burner is furnished with a valve control and very complete flame regulation is made possible since each compartment has fuel pressure control, preheated air control, and each burner has valve control. The temperature throughout the length of the furnace as well as the temperature in each port may be varied at will. By controlling the locations of the hot spots in the furnace, the movement of convection currents of the glass shown in Figures 10 and 11 of the drawings may be regulated to such an extent that the flow of any unmelted batch or surface glass is limited to the speed of displacement in its travel towards the refining end of the furnace thereby insuring complete melting at the desired position in the furnace.

The area of each port will naturally be small due to multiplicity of port openings. Due to the small size of the ports, the height of the arch above the metal in the disclosed furnace may be much less than in the common type. This will tend to confine the flame to the glass surface to obtain full advantage of the laws of heat radiation in which it is shown that heat is transmitted at a rate inversely proportional to the square of the distance of the heating medium from the metal.

Figures 5 and 6 show an alternative port construction for use with natural gas or fuel oil. The baffle walls between the two crowns are not shown although they may be used. Each port has a flue connected to the space between the two crowns, each flue being provided with a damper for regulating the preheated air. The fuel supply may be regulated to groups of burners as in Figure 2 or each burner may have individual pressure and valve control.

Figure 7 shows another modified port construction which is very effective and simple in construction. The baffle wall between the two crowns are not shown although they may be used. Preheated air is supplied above each burner opening through openings 51 in the lower crown. Each opening is provided with a damper 52 so that the preheated air for each burner may be separately controlled. The air for combustion is thus applied above the fuel from the burner and as the air stream is directed to the fuel stream at an angle, thorough mixing of air and fuel result.

By utilizing structures as herein disclosed, glass of uniform thermal and physical characteristics can be produced with greater economy in fuel, with minimum attention, and repairs of the furnace and recuperator structure.

Also, by employing the means for keeping the recuperator flues free of batch accumulations, the furnace may be maintained in operation continuously under normal conditions, instead of at gradually reduced efficiency as in prevailing melting furnaces.

We claim as our invention:

1. In a combination including a furnace, a melting chamber, a continuous recuperator air preheater over the said chamber, a plurality of parallel flues over the chamber leading preheated air from the recuperator to the furnace, said flues being laterally defined by partition walls common to adjacent flues leading the air first in one direction and then in the reverse direction, preheated air inlets communicating with the flues adjacent the sides of the furnace and the melting chamber and means to supply fuel to the inlets to complete a combustible mixture to be introduced into the said chamber.

2. In a combination including a furnace and a continuous recuperator air preheater, a melting chamber, an open-work support for the recuperator above the chamber forming passageways for waste gases between the chamber and recuperator and draft means in communication with the recuperator to move the gases through the said passageways.

3. In a combination including a glass melting furnace and a continuous recuperator air preheater, a combustion chamber, an open-work support for the recuperator forming passageways for waste gases to travel between the chamber and recuperator at an above one end of the chamber and a roof for the chamber extending horizontally from said open work support.

4. In a combination including a furnace, a melting chamber, a recuperator, vertical waste gas flues in the recuperator, an open work support for the flues forming a top wall of the melting chamber and draft means in communication with the recuperator to move gases through the flues and support.

5. In a recuperative furnace, the combination which comprises, a combustion chamber, a preheated air source extending at the sides of the top of the furnace, a roof over the chamber forming a division wall common to the preheated air source and the chamber, and inlets through the roof connecting the air source and chamber at the sides of the chamber.

6. In a recuperative furnace, the combination which comprises, a combustion chamber, a preheated air source extending at the sides of the top of the furnace, a roof over the chamber, forming a division wall common to the preheated air source and the chamber, inlets through the roof connecting the air source and the chamber, and valves in the inlets to regulate the flow of air into the chamber.

7. In combination, a furnace and a recuperator over the furnace, a combustion chamber in the furnace, a plurality of vertical flues in the recuperator to carry waste gases from the chamber, communicating draft means positioned in laterally offset relation to the recuperator to draw the waste gases from the upper end thereof and means positioned over the upper ends of the flues permitting access to clean the flues.

8. In a recuperative furnace, the combination which comprises preheated air manifolds horizontally extending at the sides of the top of the furnace, a combustion chamber, preheated air inlets to the combustion chamber from the manifolds and valve means in the inlets to control the quantity of air passing through the inlets.

9. In a recuperative furnace, the combination which comprises preheated air manifolds horizontally extending at the sides of the top of the furnace, a combustion chamber, preheated air inlets to the combustion chamber from the manifolds, fuel supply means associated with each inlet, valve means to control the quantity of air passing through the inlets and valve means regulating the fuel to the inlets to vary at will the temperature along the combustion chamber.

10. In combination in a furnace, a horizontally extending melting hearth, a combustion chamber above the hearth and a plurality of direct connected vertically disposed waste gas recuperator tubes above said hearth.

11. In a furnace, a horizontally extending hearth, a combustion chamber over a portion of the hearth, a recuperator over another portion of the hearth, a flue leading preheated air away from the recuperator along the combustion chamber, a plurality of adjacent side flues leading the preheated air in reverse direction toward the recuperator and a division wall common to all of the flues and the combustion chamber.

12. In a furnace, a horizontally extending hearth, a combustion chamber over a portion of the hearth, a recuperator over another portion of the hearth, a flue leading preheated air away from the recuperator along the combustion chamber, a plurality of adjacent side flues leading the preheated air in reverse direction toward the recuperator, a division wall common to all of the flues and the combustion chamber and inlets communicating with the side flues and the chamber.

13. In an industrial furnace, a series of heated air chambers inside the outer walls on opposite sides of the furnace, a plurality of horizontally disposed inlets connecting the air chambers and the interior of the furnace, a recuperator structure positioned to constitute a vertical stack for the waste gases of the furnace and flues common to the chambers at each side of the furnace for conducting preheated air from the recuperator to the chambers.

14. In a combination including a melting hearth and a recuperator for preheating combustion air having vertical waste gas flues in direct communication above said hearth, said recuperator being positioned above the charging end of said hearth to constitute an extension of the roof above the remaining portion of the hearth.

15. The method of removing slag deposits from an industrial furnace recuperator adapted to convey waste gases from the furnace combustion chamber through vertically disposed flues and conduct the heat to horizontally disposed air heating passages which comprises regulably increasing the temperature in the waste gas flues above the normal operating temperature to melt the slag by varying the volume of air supplied to the passages while maintaining a relatively constant volume of waste gases flowing from the combustion chamber to the flues.

16. In an industrial furnace having a preheated air channel formed within the furnace walls to convey preheated air from a recuperator to the furnace, the combination which comprises a recuperator, regulated air supply means for the recuperator, a channel in the furnace walls conveying preheated air from the recuperator to the furnace, passageways for the air through the recuperator leading to the said channel and means for diverting at will the air direct from the air supply means to the said channel in regulable quantities.

17. In an industrial furnace, a hearth, side, end and top walls forming a heating closure, a recuperator structure having vertical waste gas passages extending at one end from the top of said closure, said passages being in direct communication with said closure, said recuperator having horizontal passages constituting preheating air passages in heat exchange relation with said vertical waste gas passages, combustion chambers at the side walls of said furnace, and passages leading from the horizontal air passages of the recuperator and extending through the walls of said furnace to said combustion chambers.

18. In an industrial furnace, a hearth, side, end and top walls forming a heating closure, a recuperator structure having vertical waste gas passages extending at one end from the top of said closure, said passages being in direct communication with said closure, said recuperator having horizontal passages constituting preheating air passages in heat exchange relation with said vertical waste gas passages, combustion chambers at the side walls of said furnace, and passages in said furnace walls of greater length than said walls communicating with the horizontal preheated air passages of said recuperator and with the said combustion chambers.

19. In an industrial furnace, a hearth, side, end and top walls forming a closure, a plurality of waste gas passages extending vertically upward from the top wall, a plurality of horizontal air passages in heat exchange relation with said vertical waste gas passages, combustion chambers along the wall of said furnace above said hearth, and air passages in said furnace walls for conducting air from said horizontal air passages to said combustion chambers.

20. In an industrial furnace, a hearth, side, end and top walls forming a heating closure, a recuperator structure having waste gas passages communicating at the bottom with the interior of said closure, horizontal air passages in heat exchange relation with the waste gas passages of said recuperator, air passage extending horizontally in said furnace walls, combustion chambers along the walls of said furnace above the hearth, pressure means for conducting air through the air passages of the recuperator structure to the air passages in the wall of said furnace, and means for conducting air to the passages in the walls of said furnace without passing through said recuperator structure.

21. In an industrial furnace, a hearth, side, end and top walls forming a heating closure, a recuperator structure having vertical waste gas passages extending at one end from the top of said closure, said passages being in direct communication with said closure, and said recuperator having horizontal passages constituting preheating air passages in heat exchange relation with said vertical waste gas passages, combustion chambers at the side walls of said furnaces, passages in said furnace walls for conducting preheated air from the recuperator to said combustion chambers, and means for regulating the quantity of air delivered to said combustion chambers.

22. In a furnace and recuperator for same, spaced roofs over the furnace chamber forming a horizontal passageway for air, a recuperator adjacent the spaced roofs open to a portion of the furnace chamber, vertical pasageways for waste gas through the recuperator, and a plurality of communicating spaced passages for air through the recuperator, the lowermost being coextensive with the horizontal passageway between the said spaced roofs.

23. In an industrial furnace, a hearth, walls forming a portion of a heating closure over the hearth, a recuperator forming another portion of the heating closure over the hearth, a vertical end wall for the closure forming in common a wall for the recuperator, and a second vertical end wall for the closure below the first named end wall and in offset relation thereto to expose a horizontal portion of the hearth beyond the said first named end wall.

24. In an industrial furnace, a hearth, a closure over a portion of the hearth, a combustion space between the closure and hearth, a closure over another portion of the hearth, a hollow recuperator structure in said last closure and extending vertically above the furnace, and an end wall forming a wall of the recuperator and extending substantially below said recuperator to close that portion of the combustion space adjacent the end of the furnace.

WILLIAM A. MORTON.
HAROLD A. MOORE.
PAUL L. GEER.